United States Patent [19]

Buntsis et al.

[11] Patent Number: 4,644,423
[45] Date of Patent: Feb. 17, 1987

[54] AUTOMATIC PROGRAM SOURCE SELECTION METHOD AND APPARATUS

[75] Inventors: Frank Buntsis, 702 Raintree Garden, No. 5, Louisville, Ky. 40218; Christopher Reifsteck, Louisville, Ky.

[73] Assignee: Frank Buntsis, Louisville, Ky.

[21] Appl. No.: 666,320

[22] Filed: Oct. 30, 1984

[51] Int. Cl.⁴ .................. G11B 15/12; G11B 15/18
[52] U.S. Cl. ........................ 360/61; 360/63; 360/72.1
[58] Field of Search ............ 360/61, 63, 64, 72.1, 360/72.2; 340/789, 511, 825.26, 825.52; 369/15, 30

[56] References Cited

U.S. PATENT DOCUMENTS

| | | | |
|---|---|---|---|
| 3,541,514 | 11/1970 | Dabrowski | 340/162 |
| 3,795,769 | 3/1974 | Nowka et al. | 179/1 |
| 3,922,641 | 11/1975 | Gates, Jr. | 179/1 |
| 3,952,154 | 4/1976 | Gates, Jr. | 179/1 |
| 4,035,589 | 7/1977 | Parke | 179/100.1 |
| 4,395,740 | 7/1983 | Yuen et al. | 360/72.2 |

*Primary Examiner*—Vincent P. Canney
*Attorney, Agent, or Firm*—Cushman, Darby & Cushman

[57] ABSTRACT

A method and apparatus permits interfacing of several independent program sources so that a secondary program source is operated in a playback mode while a search mode is engaged for a primary program source. For example, an audio cassette device may be operated in a playback mode while a video cassette device is under the automatic search control of a conventional programmable auto search control unit. The interfacer apparatus of the present invention permits completion of any previously started audio cassette message before playback operation of the video cassette device begins. The method and related apparatus permits maximum retention of the attention span of display users by preventing any significant lapse or gaps in presentation, thereby making the present system particularly suitable for holding the continuous attention of potential customers and students.

10 Claims, 2 Drawing Figures

AUTOMATIC PROGRAM SOURCE SELECTION METHOD AND APPARATUS

BACKGROUND OF THE INVENTION

The present invention is concerned with a method and apparatus for automatically selecting program sources. In particular, it is concerned with the interface of two specific program sources, such as a video cassette machine and an audio cassette machine, wherein a user has designated particular information from the video cassette machine for viewing.

Video cassette machines combined with video displays have obtained wide acceptance and usage in a great variety of environments. One such particular environment includes stand-alone marketing displays located in retail outlets. Such displays permit users (i.e., potential customers) to view selected marketing materials in accordance with their particular interests. Similar user-oriented stand-alone displays are especially useful and frequently used in educational environments, where no marketing is involved.

In either instance, and any other such similar situations, the user (potential customer or student) must experience a variable delay period while a search involving fast forward or rewind operation is undertaken to locate the desired information stored on the video cassette. Such time periods may involve as much as 3½ minutes whenever the desired information is located a maximum distance away from the present position of the tape of the video cassette. Such a delay is of extreme potential detriment in either the potential customer or student environment inasmuch as a critical attention span may be lost.

The present invention addresses this problem of potential attention loss by suitably interfacing a second program source (such as an audio cassette machine) with the primary user-selectable program source (such as a video cassette machine). Apparatus is disclosed by the present invention for interfacing a known program source control device with two program sources, and a method of operation for the total display system is taught.

SUMMARY OF THE INVENTION

In accordance with the present disclosure, an apparatus possesses logic means for determining commanded operations of the first program source, input means for determining the presence of output signals from a second program source, and control means responsive to both the logic means and input means to suitably control the first and second program sources so as to prevent a potential attention span lapse by display users.

The present invention also discloses a method to suitably control the apparatus of the present invention (or other suitable apparatus) in combination with a conventional programmable auto search control and two program sources.

Attempts have been made in the prior art to minimize the problem of lapse of attention span by reducing access time to selected information. For example, the U.S. Patent to Yuen et al (No. 4,395,740) teaches multiple tape units with an interfacing controller interposed therebetween. Each tape unit is loaded with a tape(s) of essentially identical messages, and the tape units are divided into separate groups, with a certain set of messages associated with each group. Each physical tape is then initially located at a point approximately midway of its respective group of messages. A user indicates through a keyboard input into the controller the particular message which he or she desires to receive. The controller then automatically selects the appropriate tape unit associated with the selected message and appropriately controls the specific tape unit to fast forward or rewind the same to the specific location of the selected message. By selectively grouping and locating a multiplicity of redundant or identical tapes, Yuen discloses actual physical reduction of the potential tape distance to any one particular selected message, thereby reducing access time.

While the teachings of Yuen would appear to shorten search time in comparison with a single tape, his approach to the problem of potential attention span lapse is totally distinct from that of the present invention wherein search time is automatically filled with a secondary program source. Other teachings of the prior art have included devices for interfacing primary and secondary program sources, but these are not concerned with solution of the specific problem discussed by the present invention. Examples of such controllers include U.S. Patents to Gates, Jr. and Parke (Nos. 3,922,641 and 4,035,589 respectively).

BRIEF DESCRIPTION OF THE DRAWINGS

These as well as other features and advantages of this invention may be better understood by reading the following detailed description of the presently preferred exemplary embodiment and the accompanying drawings, in which.

DESCRIPTION OF PREFERRED EMBODIMENT

Figure 1:
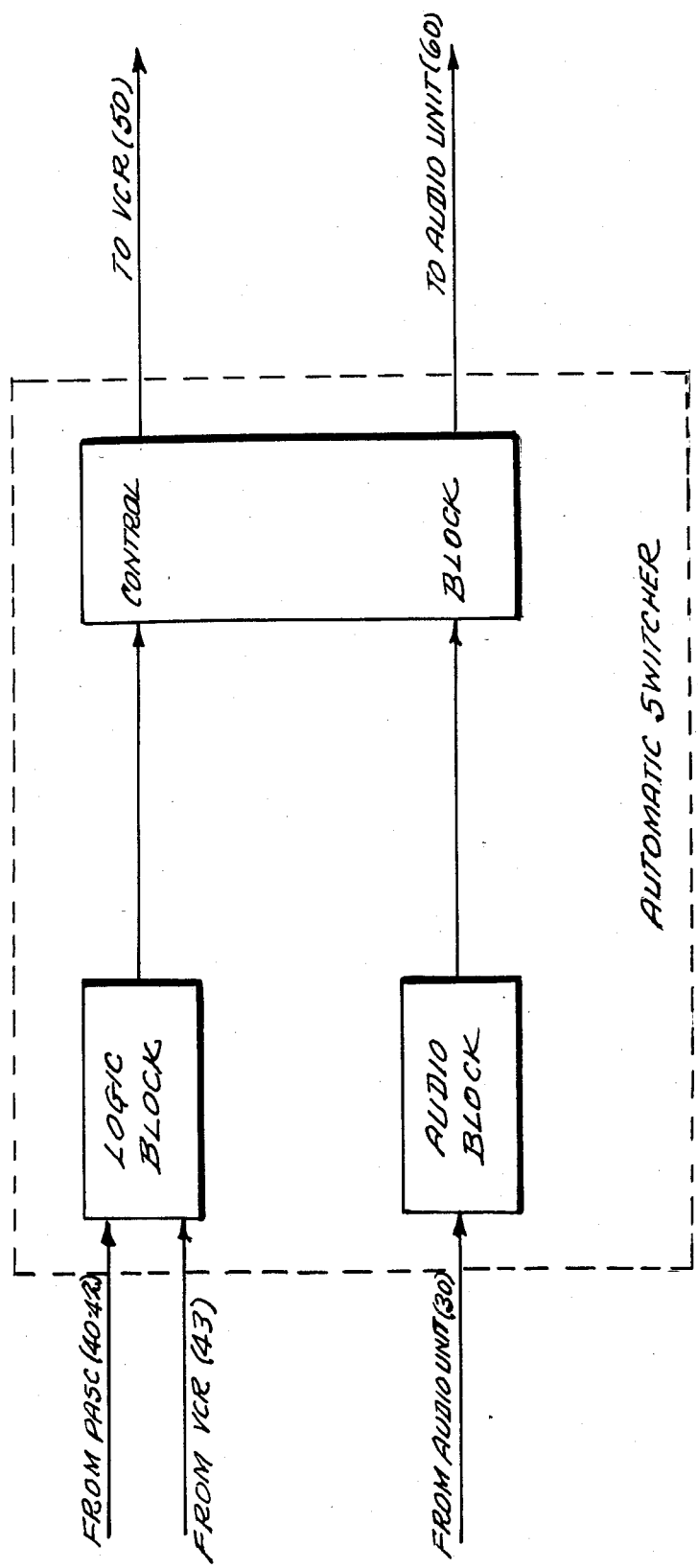
FIG. 1 is a block diagram view of the apparatus of the present invention as it interfaces with existing devices.

In the preferred embodiment shown in FIG. 1, the automatic switcher apparatus of the present invention interfaces an existing programmable auto search control (PASC) device with a video cassette recorder and an audio cassette unit. Programmable auto search control devices are known which permit a user to designate or command specific information which he or she desires to view. The PASC may be previously loaded with formatting information for a particular video cassette so that automatic access may be made to various segments or portions of the tape.

Programmable auto search controls which are functional with the present invention include, for example, the RX-353/RX-303 manufactured by Sony Corporation. This conventional device has a memory capacity of up to 63 separate segments or portions of a tape for designation by a user. This PASC permits interface with most of the Sony manufactured industrial Betamax video cassette decks or devices such as SLO320, SLO323, SL0325, SLOY20, SLP300, SLP303, or the U-Matic industrial video cassette recorders such as VO2860, VO2860A, VO2611, VO5600 and UP5030. The method of the present invention is equally applicable to the programmable auto search control model NV-A850 manufactured by the Panasonic Corporation. This device has a memory capacity of up to 64 segments (or selectable portions of a tape) and interfaces with Panasonic solenoid-operated one-half inch VHS decks NV8170 and NV8200, and with three-quarter inch VCRs NV9240, NV9600 and AU700. The invention also is utilizable with a Random Access Control RMP-500U manufactured by JVC. This device has a memory capacity of up to 64 segments and interfaces with JVC professional one-half inch UHS decks BP-4300U and BR-6400U.

In a conventional arrangement, one of these programmable search control units would be directly connected with an appropriate video cassette recorder. The present invention however is adapted to receive the command signal outputs from the search control unit and institute actual control of the video cassette recorder in accordance with the methodology of the present invention. Inputs from a PASC are shown with regard to the logic block of FIG. 1. These inputs, 40 through 42, may include signals for rewind, fast forward and play. The logic block of the automatic switcher of the present invention analyzes the control or command signals output by a PASC and controls the overall display unit accordingly, as will be discussed further below.

To enable an initialization mode of the automatic switcher, a signal 43 is received from the video cassette recorder as an indication that a video cassette has been placed into the video cassette recorder. This means that the video cassette recorder (first program source) is "ready" for operation. The programmable auto search control devices operate with a normal initialization process wherein the first small portion of a video cassette (for example, approximately 20 seconds) is read into a memory of the PASC to obtain format information for that particular video cassette. The PASC then causes the video cassette recorder to rewind to its start position. With this loaded information, the PASC is now ready to issue commands for playback of specific segments of the video cassette in response to user-designated selections.

Utilizing in part the signal 43, the automatic switcher apparatus of the present invention operates in an initialization mode so as to not interfere with the normal initialization process of the programmable auto search control device. Upon completion of this initialization mode, the automatic switcher device of the present invention will again assume direct control of the video cassette recorder, and be indirectly responsive to the command signals 40 through 42 output by the programmable auto search control device to control the video cassette recorder.

With further reference to FIG. 1, the audio output of an audio cassette device is input at 30 into the audio block of the apparatus of the present invention. This signal is used for switching purposes only by the automatic switcher device inasmuch as the automatic switcher device operates so as to not stop or halt a message until the completion thereof. The audio cassette will be commanded by the automatic switcher to play only whenever the automatic switcher is in an operational mode, occurring after the initialization mode discussed, supra.

While in its operational mode, the control block of FIG. 1 responds to signals from the logic block to command (via output 50) a video cassette recorder to pause, play or search (for example, rewind or fast forward). Output 50 is actually a pause control to prevent particular operation of the video cassette recorder whenever input 40 (play) is being commanded by the programmable auto search control device. Fast forward and rewind of the video cassette recorder may be typically under direct control of the programmable auto search control device, with delay of the play function possible by the apparatus of the present invention. A play signal from the PASC will be withheld from the video cassette recorder (that is a pause signal will be transmitted to the video cassette recorder simultaneously therewith) whenever an audio cassette message is in progress.

In accordance with the method of the present invention, output 60 of FIG. 1 is adapted to control an audio cassette device for playback operation to fill up the potential attention span lapse occurring while a video cassette recorder is being fast forwarded or rewound to a particular desired segment of information contained on the video cassette. The method of the present invention (and the apparatus of the present invention) is responsive to completion of the video cassette recorder "search" process to end playback operation of the audio cassette deck upon completion of a presently played audio cassette message.

Typically, the audio cassette may have short messages of perhaps 20 to 30 seconds contained thereon with 3 to 5 seconds of silence spaced therebetween. The audio output of the audio cassette is used as a command switching input 30 to the automatic switcher of FIG. 1 so that, when conditions are proper as discussed above, playback operation of the audio cassette unit will be ended upon completion of a particular message.

Upon termination of the audio cassette playback operation, the automatic switcher then permits playback operation of the video cassette recorder, which has been brought to the desired information segment via the search process. This particular operation permits continuous retention of the attention of a potential customer or a student while specific video cassette information is located and prepared for their review. It is particularly advantageous to have short segmented messages as a preview to potential video cassette messages in that the audio cassette messages may be readily adapted to particular circumstances, such as highlighting specific events at a trade show or current promotions being sponsored by a particular manufacturer. It is further advantageous in that the audio cassette information is more readily adaptable than is the video cassette information, and the apparatus and method of the present invention permits separate access to the audio cassette from the video cassette thereby permitting full exploitation of this adaptability. The attention span of a potential customer or student is continued during an audio cassette presentation to a much higher degree than would likely occur if only printed materials were available. It is a further advantage of the method and apparatus of the present invention that, once begun, a particular message from the audio cassette device is not interrupted but is permitted to be completed before the video cassette program is started. This further permits smooth transition for the attention of a display user from audio cassette to video cassette in that no disorienting lengthy interruption occurs.

Figure 2:
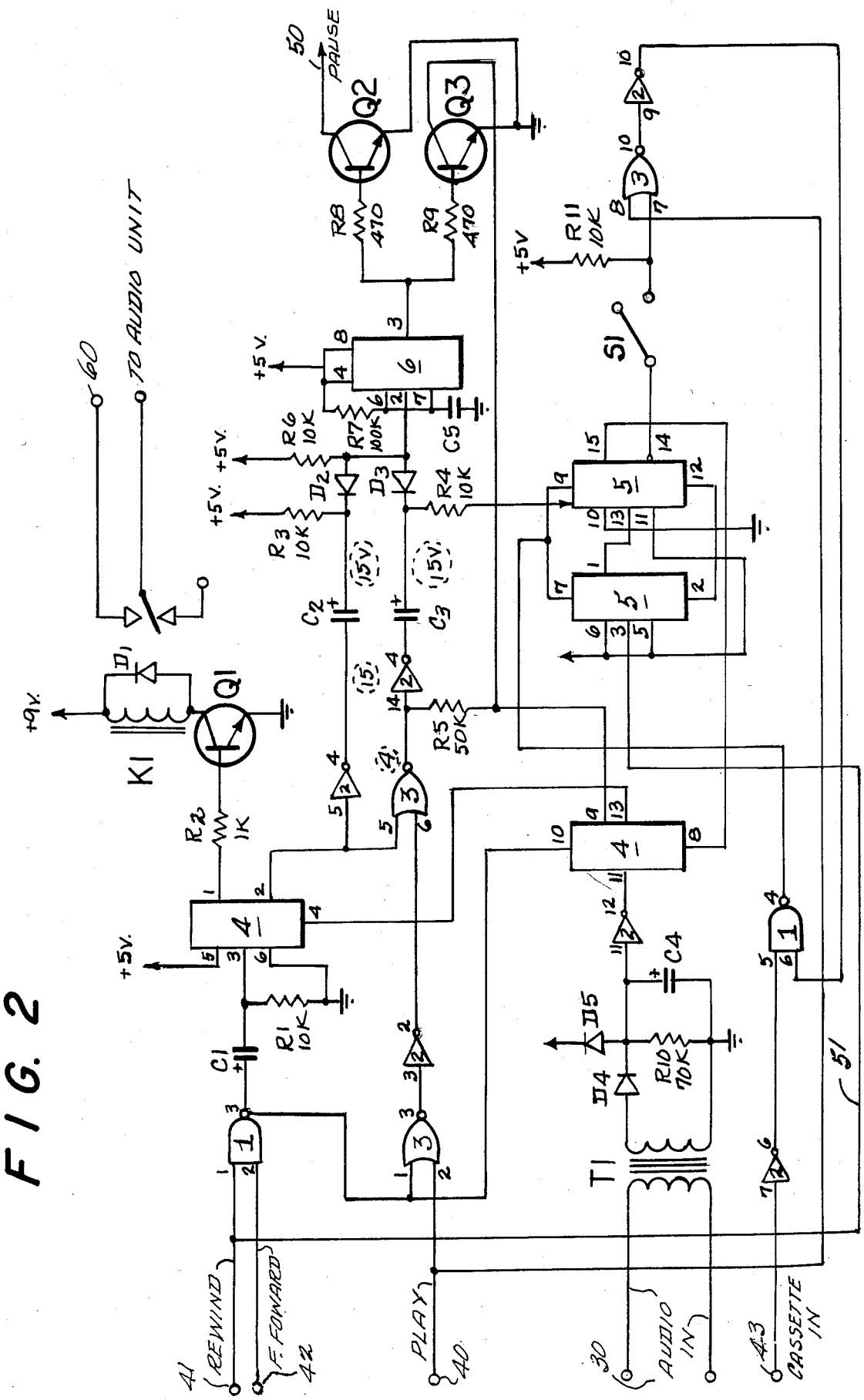
FIG. 2 is a detailed circuitry diagram for the apparatus of the present invention as shown in FIG. 1.

The detailed circuitry enabling the apparatus of FIG. 1 is presented in FIG. 2, where reference characters repeated from FIG. 1 indicate the same elements in FIG. 2. The reference characters in FIG. 2 which appear to repeat solely within that figure are not literal repetitions. Pin numbers are indicated on the integrated circuit chips of the diagram so as to fully enable one of ordinary skill in the art in understanding the interconnections of circuitry for a particular embodiment of the present invention. Thus, pin numbers which appear to repeat from one integrated circuit chip to another are actually unique in that they may be referred to in combination with the specifically recited integrated circuit chip. Furthermore, chip designations which appear to repeat are not repetitions in that, for example, integrated circuit chip No. 4 is a dual D flip-flop with two separate flip-flops incorporated into a single chip. Note that the pin numbers utilized for the two integrated circuits designated by 4 do not repeat. Thus, the upper integrated circuit 4 and lower integrated circuit 4 are actually contained on a single chip. This apparent redundancy is believed well understood by one of ordinary skill in the art working with integrated circuitry, and may be fully understood with reference to the following table which provides specific exemplary chips for the elements of FIG. 2.

TABLE 1

| IC1 | CD4011A | NAND gate |
|---|---|---|
| IC2 | CD4049A | Inverter |
| IC3 | CD4001A | NOR gate |
| IC4 | CD4013A | Dual D Flip-Flop |
| IC5 | CD4027A | Dual JK Flip-Flop |
| IC6 | NE555 | Timer |
| Q1-Q3 | 2N2222A | Transistors |
| D1-D5 | IN4148 | Diodes |

Upon initial introduction of power (i.e. closure of switch S1) to the automatic switcher of FIG. 2, the operational state of the switcher is indeterminate. A signal received on line 43 indicates placement of a video cassette in the video cassette recorder associated with the overall system. This signal is an active low pulse sent from the video cassette deck whenever a cassette is properly inserted and engaged. This active low signal is made high by the inverter 2 (located between pins 7 and 6 thereof) and is introduced into pin 5 of NAND gate 1. So long as a clearing signal is not provided on pin 6 of NAND gate 1, a high output at pin 4 of NAND gate 1 will result from the video cassette "in" signal on line 43.

As is shown in FIG. 2, this pin 4 NAND gate 1 output is fed to the respective set pins 7 and 9 of the two JK flip-flops of integrated circuit 5. Pin 6 of integrated circuit 5 is a J input and pin 5 is a K input. Both of these inputs are tied to a positive 5 volt source (i.e., a high signal). This 5 volt high signal is also applied to pin 11, the K input of the right hand JK flip-flop. The J input (pin 10) of the right hand JK flip-flop is set to ground, as are the respective reset pins, 4 and 12 respectively.

Pin 15 of integrated circuit 5 is the Q output of the right hand JK flip-flop, and this output sets the audio flip-flop, which is the lower D flip-flop of integrated circuit 4. This D flip-flop in turn sets the main control flip-flop, the top D flip-flop of integrated circuit 4. That is to say that the Q output (pin 13) of integrated circuit 4 is tied to the reset pin 4 of integrated circuit 4.

Thus, the practical effect of an active low signal on video cassette "in" input 43 is the setting of both flip-flops of integrated circuit 5, the right hand half of integrated circuit 5 setting the lower flip-flop of integrated circuit 4, this lower flip-flop setting the main control flip-flop of integrated circuit 4, and the Q output thereof (pin 1) remaining low to prevent operation of solenoid K1, thereby keeping the functions of the FIG. 2 audio video switcher dormant at this time.

As discussed earlier, during this initialization mode, the PASC will rewind the video tape to its beginning. Introduction of this rewind signal causes clocking via line 51 into pin 3 of the left hand flip-flop of integrated circuit 5. This causes Q output pin 1 of integrated circuit 5 to become low whenever the rewind signal goes from its active state (low) to its inactive state (high). The PASC subsequently causes the play line to go low so that the PASC may read the formatting data from the beginning of the video cassette, as previously described. Upon completion of this transfer of format information from the newly inserted video cassette into memory of the PASC, the PASC again causes the rewind line to go low to rewind the video cassette to its beginning.

Upon this occurrence of the rewind signal going from low to high, the integrated circuit 5 left is again clocked via line 51 at pin 3, causing its Q output pin 1 to go from low to high. As is seen in FIG. 2, the Q output of the left hand side of integrated circuit 5 is input to the clock pin 13 of the right hand portion of integrated circuit 5. Thus, this raising of Q output 1 of integrated circuit 5 from low to high clocks the right hand portion of integrated circuit 5, whose Q output pin 15 now goes low, releasing the set input on audio flip-flop integrated circuit 4 pin 8. This allows the audio flip-flop to respond to the audio from the audio cassette, and releases the upper portion of integrated circuit 4 from its previously enforced reset (inactive) state.

The main control flip-flop (upper portion of integrated circuit 4) will now activate the solenoid relay K1 when either a rewind signal received on line 41 or a fast forward signal received on line 42 is generated by a user-search request to the PASC. Following the logic of integrated circuits 3 through 6, it may be seen that the main control integrated circuit 4 will now allow a play signal to pass from the PASC to the video recorder device. This is achieved by a requested segment tape portion triggering the 555 timer, to momentarily pulse the pause line, thereby causing the video cassette recorder to pause as long as the relay remains closed.

The foregoing explains the function of the apparatus and method of the present invention wherein the video cassette deck is paused until the audio from the audio deck disappears at the end of an announcement. As is seen in FIG. 2, input 30 is adapted to receive the audio input from an audio cassette deck, and the associated transformer T1 and diodes D4 and D5 rectify these signals and input them to the bottom portion of integrated circuit 4. Whenever such an audio signal disappears, the rectified audio being fed to pin 11 of integrated circuit 2 no longer maintains capacitor 4 in a charged state, and thus the clock input pin 11 of integrated circuit 4 goes from low to high (due to the inverter output 12 of integrated circuit 2) thereby causing the state of data pin 9 to appear on the Q output line 13 of integrated circuit 4. If the pause line is currently being pulsed, there will be no result since pin 9 of integrated circuit 4 will be low until the pause pulse is completed.

If the pause line is no longer still being held low, a logic high on pin 9 of integrated circuit 4 is clocked to the reset pin 4 of integrated circuit 4 causing the relay K1 to release. Through integrated circuit pins 5 and 4, the 555 timer is triggered which momentarily pulses the pause line low, thereby releasing the video cassette recorder from its pause state and allowing it to play the selected video segment.

Thus, completion of a particular audio cassette message permits the relay K1 to discontinue playback operation of the audio cassette and permits output line 50 (pause line) to begin video cassette recorder playback operation. The three transistors Q1–Q3 enable proper switching levels for the solenoid relay K1 and pause line 50, and are well understood by one of ordinary skill in the art without further explanation.

One of ordinary skill in the art will readily recognize numerous modifications and variations to the present invention, and all such obvious embodiments or uses are intended to fall within the scope of the present disclosure which presents a novel method and apparatus solution to problems associated with potential attention span lapse during the search mode of a video cassette recorder (or designated primary program source). The method and apparatus of the present invention uses a second program source (for example, an audio cassette device) to fill up search time for a primary program source (for example, the video cassette recorder device). Whenever the primary program source is an interactive video system utilizing video tape, search time might be as long as 3 to 4 minutes. Interactive video systems which utilize video disks do not have this disadvantage in that their maximum search time is typically only about 5 seconds. These video disk based systems do however have other disadvantages such as high development costs and high cost of hardware in conjunction with lack of ready availability of video programs therefor. Interactive video systems using video tape are much more flexible and less expensive than those based on video disks.

Other systems based on computer control have been proposed to enhance the use of video tape based interactive video systems, and these include random access video players coupled with microcomputers. For example, General Technical Corporation, located in Evansville, Ind., has developed an ETS 2000 video controller that interfaces such a random access video player with a microcomputer to thereby allow automatic location of any particular segment on a video tape. However, even this sophisticated microcomputer control does not overcome the search time disadvantages discussed and addressed by the present invention.

Use of the method and apparatus of the present invention significantly increases the number of applications of video tape based interactive video systems while making development of this display system even more cost effective in comparison with video disks. All such variations of environment with regard to user-presentation are intended to fall within the scope of the method and apparatus of the present invention, which invention is also further defined in view of the specification with regard to the following appended claims.

What is claimed is:

1. An automatic program source selection apparatus for interfacing at least first and second controllable program sources comprising:
   logic means for determining commanded search and play operations of the first program source;
   second-source input means for indicating the presence of a signal input thereto from the second program source;
   control means for responding, during an operation mode thereof, to determinations of said logic means and indications of said input means to control said first and second program sources to cause playback operation of said second program source during commanded search operation of said first program source, and to permit play operation of said first source whenever such is commanded and said input means does not indicate the presence of a signal input thereto.

2. An apparatus as in claim 1, wherein said control means is further for operating in an initialization mode upon reception of a first program source-ready signal from said first program source, wherein during said initialization mode said control means is inactive for a defined initialization period and then automatically returns to said operation mode.

3. An apparatus as in claim 1, wherein said control means further includes means for causing said first program source to enter a pause mode if said logic means determines a commanded play operation for said first program source while said second program source is being controllably operated in a playback operation by said control means.

4. An apparatus as in claim 3, wherein said control means further includes means for ceasing playback operation of said second program source whenever said control means permits play operation of said first program source.

5. An apparatus as in claim 1, wherein said second-source input means includes means for selectively responding to a rectified sample of said second program source.

6. An apparatus as in claim 1, wherein
   said logic means is adapted to receive control signals from a programmable auto search control for controlling a video cassette machine constituting said first program source, and
   said second-source input means is adapted to receive audio output from an audio cassette machine constituting said second program source.

7. An automatic multi-source program system comprising:
   a video cassette machine;
   an audio cassette machine;
   a user-programmable auto search control for outputting desired video cassette machine operation command signals; and
   an audio-video switcher means for selectively controlling said machines in response to command signals from said auto search control, said selective control including playback operation of said audio cassette machine during a search mode operation of said video cassette machine, and cessation of playback operation of said audio cassette machine during playback operation of said video cassette machine; said switcher means including means for causing a delay in auto search control-commanded playback operation of said video cassette machine until completion of a message segment produced from said audio cassette machine.

8. A system as in claim 7, wherein
   said video cassette machine includes means for outputting a signal indicating that a video cassette has been inserted into the video cassette machine; and
   said switcher means further includes means for sensing said insertion in accordance with the output signal of said indication means of said video cassette machine and for establishing said switcher means in an initialization mode in response to such sensing, said initialization mode including cessation of control functions of said switcher means for an initialization period and including subsequent automatic return to said selective control.

9. A method of operating a multi-media display comprising the steps of:
   providing a video cassette machine and associated video monitor;

providing an audio cassette machine;

permitting users of the display to select particular information on a video cassette for viewing;

initiating a search operation for the video cassette machine to locate the selected information; and causing said audio cassette machine to playback recorded messages to said users during said video cassette machine search operation;

the method further comprising the steps of:

determining the completion of an initiated search operation;

ceasing playback of said audio cassette machine after said determination step at the next end of a recorded message; and causing playback of said selected information on said video cassette after ceasing playback of said audio cassette machine.

10. A method as in claim 9, further comprising the step of:

initializing said display by (a) temporarily not permitting users to select information, (b) loading a video cassette into said video cassette machine, (c) determining the information format of said loaded video cassette, (d) providing said determined information to said users and (e) returning to the step of permitting users to select information.

* * * * *